United States Patent [19]

Perera

[11] Patent Number: 4,867,551

[45] Date of Patent: Sep. 19, 1989

[54] DISPLAY PROJECTION OPTICAL SYSTEM FOR SPECTACLES OR SUNGLASSES

[76] Inventor: Kalukapuge T. Perera, 22113 Martella Ave., Boca Raton, Fla. 33433

[21] Appl. No.: 217,674

[22] Filed: Jul. 11, 1988

[51] Int. Cl.[4] .............................................. G02C 1/00
[52] U.S. Cl. ...................................... 351/158; 351/57
[58] Field of Search .................. 351/57, 158; 350/174; 368/10

[56] References Cited

U.S. PATENT DOCUMENTS

| | | | |
|---|---|---|---|
| 4,274,149 | 6/1981 | Flanagan | 368/10 |
| 4,526,473 | 7/1985 | Zahn, III | 368/10 |
| 4,751,691 | 6/1988 | Perera | 351/158 |

Primary Examiner—Rodney B. Bovernick
Assistant Examiner—P. M. Dzierzynski

[57] ABSTRACT

A miniature display projection system, for attachment to a pair of spectacles or sunglasses, or made as an integral system combination, display projection and sunglasses. A miniature opto-electronic display panel is driven by micro electronics to generate bright luminous display images, providing useful displays such as time of day or even television images. A novel optical projection window is used to project the display, such that to appear superimposed onto the normal field of view of the spectacles or sunglasses wearer, when the display panel is activated. When the display panel is not active the normal field of view is seen unhindered.

10 Claims, 4 Drawing Sheets

DISPLAY PROJECTION OPTICAL SYSTEM FOR SPECTACLES OR SUNGLASSES

BACKGROUND OF THE INVENTION

1. Field of the Invention

This invention relates to a miniature optical system capable of superimposing the image from an opto-electronic display panel on to the normal field of view of a spectacles or sunglasses wearer. More particularly, it relates to a combination of a spectacles or sunglasses with a miniature optical projection system, to display the visual images from a miniature optoelectronic display panel, to appear projected on to the normal field of view of the spectacles or sunglasses wearer.

2. Description of the Prior Art

Inventions in the past, for heads up and hands free display of information have been aimed towards specialized applications. To mention a few, U.S. Pat. No. 4,274,149 by Flanagan, issued June 16, 1981 describes an electronic timer built into binoculars, to superimpose timing information on to the binocular field of view, for timing sports events. U.S. Pat. No. 4,526,473 by Zahn III, issued July 2, 1985 describes a sports timer, combined with a pair of goggles to display timing information for athletes while performing.

Advanced heads up display (HUD) systems, built on to the helmuts of fighter aircraft pilots exist, for displaying visual information superimposed on to his field of vision. My own invention described in U.S. Pat. No. 4,751,691 issued June 14, 1988 attempts at providing heads up information display for use by the general public. In particular, it relates to an electronic timepiece combined with ordinary spectacles or sunglasses.

SUMMARY OF THE INVENTION

The principal object of the present invention, is the combination of a miniature opto-electronic display panel, with ordinary spectacles or sunglasses to provide the capability of projecting and displaying useful visual information, superimposed on to the normal field of view of the spectacles or sunglasses wearer, when the display is activated.

Another object of the present invention is to provide a simplified and improved display projection system for attachment or combination to ordinary spectacles or sunglasses.

Yet another object of the present invention is to provide information display with freedom from positioning the head or eyes away from another task to view the display.

DETAILED DESCRIPTION

The present invention will now be clarified in detail with referance to the drawings.

Figure 1:
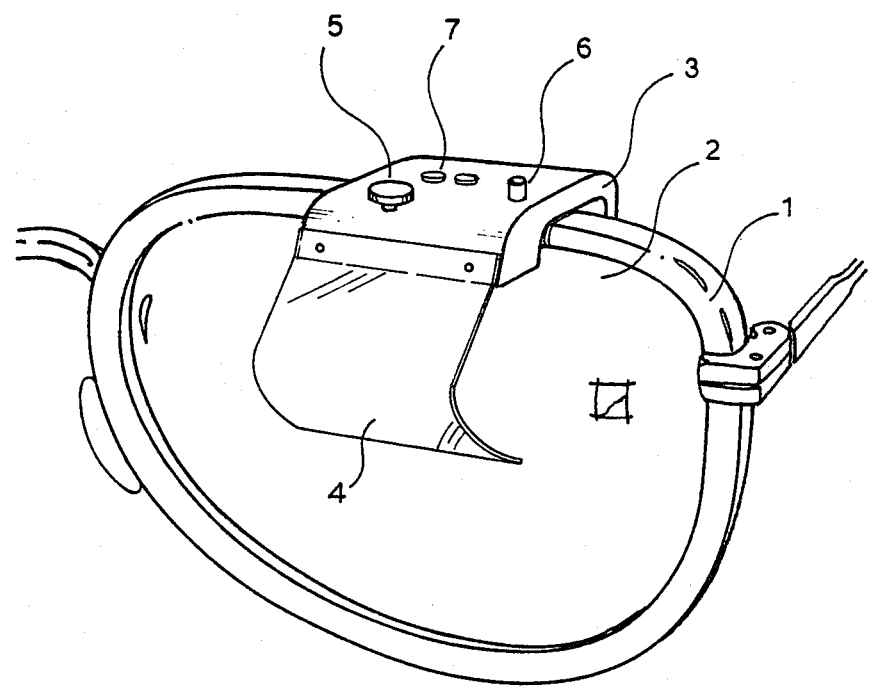
FIG. 1 shows the external perspective view of the display projection system, attached to a spectacles frame.

FIG. 1 shows an embodiment of the present invention in perspective. It is mounted on to the upper part of the rim of a spectacles or sunglasses frame labelled 1.

FIG. 1 shows the display system as designed to be mounted and standing on the outside of a spectacles eye-piece labelled 2. The miniature housing 3 is shown with a slot along the bottom length for convenient seating on to the spectacles or sunglasses frame rim, for mounting purposes, where it will be secured by a fixing screw. The housing 3, shall contain all the micro electronics to generate display information, an opto-electronic display panel to produce visual images when electrically activated, and a miniature watch battery to provide electrical power to the micro electronic circuitary and the opto-electronic display panel.

FIG. 1 also shows an adjusting screw 5, which can be turned by finger and functioning as a focussing adjustment to focus the display image to suit the spectacles or sunglasses wearer. A miniature push button type micro switch 6 is shown, this is used for activating the opto-electronic display panel whenever the user wishes to view the display. Further micro switches 7 are coupled to the micro electronic circuitary to enable the presetting or selection of the display information parameters and functions.

FIG. 1 also shows the novel projection window 4 used in this invention. It is made of thin optically transparent material. The projection window 4 is fixed to the housing 3 and protrudes down as shown. The bottom end of the projection window 4 is shown curved and slanting, approximately at an angle of 45 degrees, away from the eye-piece of the spectacles or sunglasses. This curved portion, is the active part of the projection mechanism and takes the shape of an oblong sectional part of a parabolic surface. The concave side of the parabolic surface facing inwards towards the eye. The working of the novel projection window will be further clarified in the following description.

Figure 2:
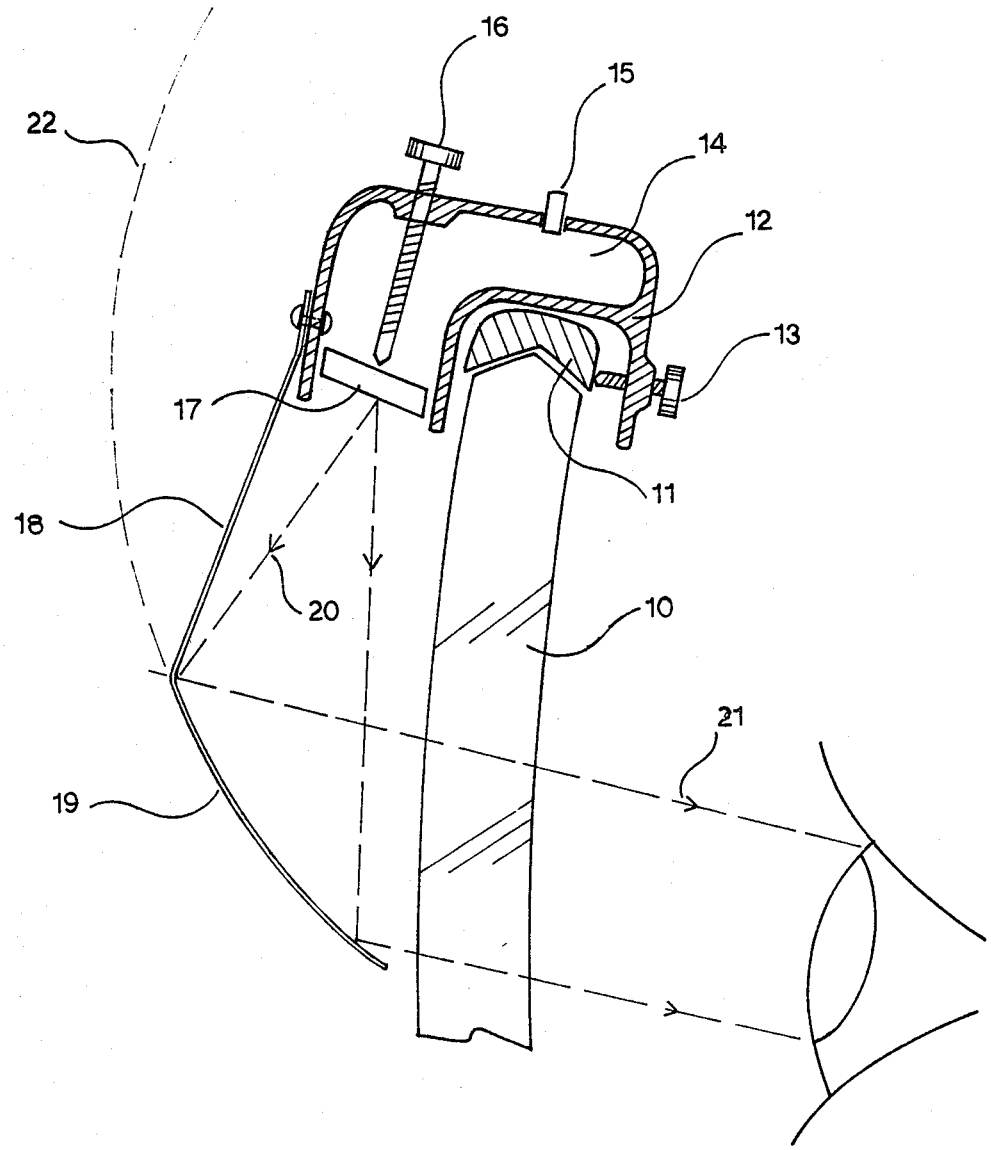
FIG. 2 shows a cross-sectional view of one embodiment of the display projection system, attached to a spectacles or sunglasses frame. This embodiment is designed to stand on the outer surface of a spectacles or sunglasses eye-piece when mounted.

FIG. 2 illustrates the display system clearly with a cross-sectional drawing. Part of the spectacles or sunglasses eyepiece section 10 is shown with the rim section 11 of the frame. The display system housing 12 is shown with the mounting slot seated onto the rim 11. Screw 13 is used to secure the housing 12 to the spectacles or sunglasses. The inside 14 of the housing shall contain the micro electronic circuitary and the miniature power supply battery (not shown here for clarity). 15 shows the miniature push button micro switch for display activation.

The opto-electronic display panel is shown in section labelled 17. The display panel surface is shown slanted for optimum projection angle. The display panel is free to move up or down a large slot in the housing as shown. A screw 16 shall be screwed to the top part of the housing and is mechanically coupled to the display panel, such that, when the screw 16 is turned one way or the other, the display panel 17 moves up or down inside the housing. The display panels display surface is faced down and open to the outside of the housing.

FIG. 2 shows a cross-sectional view of the novel projection window labelled 18 and 19 fixed to the housing.

As mentioned before, the active part of the projection window section 19 is shown in FIG. 2 concaved inwards, towards the eye. As said before, the active section 19 of the projection window is a part section of a parabolic surface. This is illustrated in FIG. 2 by the dashed line 22, which shows the continuation of the parabolic surface. This clearly illustrates the positional relation of the parabolic section 19 to the focal point, which is situated approximately at the display panel position 17.

For further illustration of the projection mechanism, a point source on the display surface is shown emanating rays of light depicted by the dashed line 20, where it is intercepted by the active parabolic section 19. The projection window is made of thin optically transparent material. Therefore the light ray 20 is partially reflected along the dashed line 21 as shown. The whole active section 19 partially reflects the light intercepted from the point source and projects all parallel towards the eye. The light from the normal field of view of the spectacles or sunglasses is transmitted through the thin transparent projection window with no distortion or obstruction. Therefore a virtual image of the display is seen superimposed on the normal field of view whenever the display is activated. When the display is not activated the projected display is not seen in the normal field of view.

Figure 3:
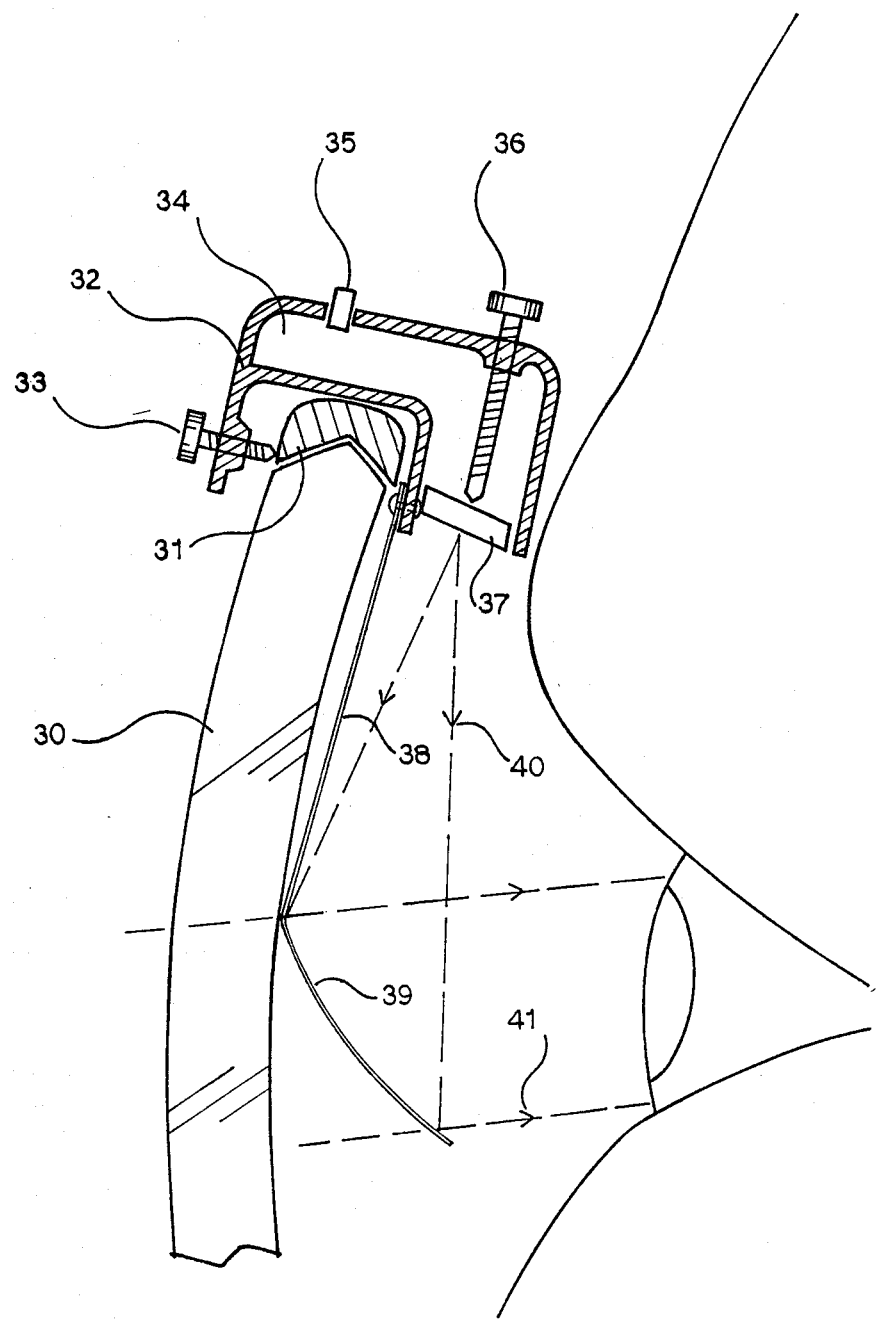
FIG. 3 shows a cross-sectional view of another embodiment of the display projection system attached to a spectacles or sunglasses frame. This embodiment is designed to stand between the eye and an eye-piece of the spectacles or sunglasses.

FIG. 3 shows a cross-sectional view of the display projection system with a different mounting arrangement. In this design the projection system when mounted, stands between the eye and an eye-piece of the spectacles or sunglasses.

Part of a spectacles or sunglasses eye-piece section 30 is shown with rim section 31 of the frame. The display system housing 32 with the mounting slot is shown seated onto the rim 31. The screw 33 secures the display system to the spectacles or sunglasses. The inside 34 of the housing shall contain the micro electronic circuitary and the miniature battery (not shown for clarity). Label 35 shows the miniature push button micro switch fir display activation. A cross-section of the display panel 37 is shown with the display face slanted for optimum projection position. A screw 36 shall be screwed from the top of the housing, to which the display panel is mechanically coupled, such that, when the screw is turned one way or the other, the display panel 37 moves up or down inside the housing. The display panels display surface is faced open down to the outside of the housing.

A sectional view of the novel projection window is shown labelled 38 and 39 fixed to the housing. As mentioned before, the active part of the projection window is shown concaved towards the eye. As said before the active section 39 of the projection window is a part section of a parabolic surface, with the focal point approximately positioned around the display panel 37.

For illustration a point source of light emanating from the display surface is shown by the dashed line 40, where it is intercepted by the active projection surface 39 and partially reflected, producing the parallel beam shown by the dashed line 41, when in correct focus. The light from the normal field of view is transmitted through the spectacles or sunglasses eyepiece 30 and then through the optically transparent projection window 38 and 39 without distortion or obstruction. Therefore a virtual image of the display is seen superimposed on the normal field of view, whenever the display is activated. When the display is not activated, the display image is not seen superimposed in the normal field of view.

Figure 4:
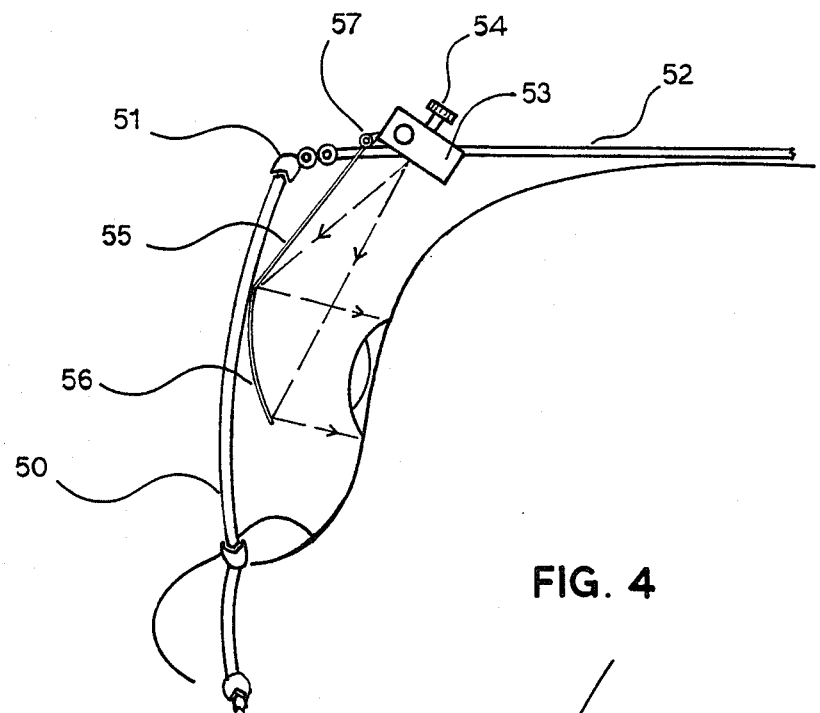
FIG. 4 shows a plan view cross-section of yet another embodiment of the display projection system, here it is attached to one arm of the spectacles or sunglasses frame.

FIG. 4 shows a cross-sectional plan view of another embodiment of the display projection system. This arrangement is designed for mounting on to one arm of a spectacles or sunglasses so that the projection window shall stand between the eye and one eyepiece of the spectacles or sunglasses. The spectacles or sunglasses eye-piece section 50 is shown with frame rim section 51 and one arm of the frame 52. The projection system housing 53 is mounted and secured at an angle to the frame arm 52 as shown. Screw 54 is the focussing adjustment screw as described previously. The novel projection window 55 and 56 is shown hinged to the housing 53 at point 57. The hinge enables the spectacles or sunglasses arm 52 to be retracted into storage position. The projection window 55/56 shall be spring loaded, such that when the spectacles or sunglasses arm 52 is opened out, the projection window will be forced open about the hinge and come to rest against the eye-piece 50 into projection position.

Figure 5:
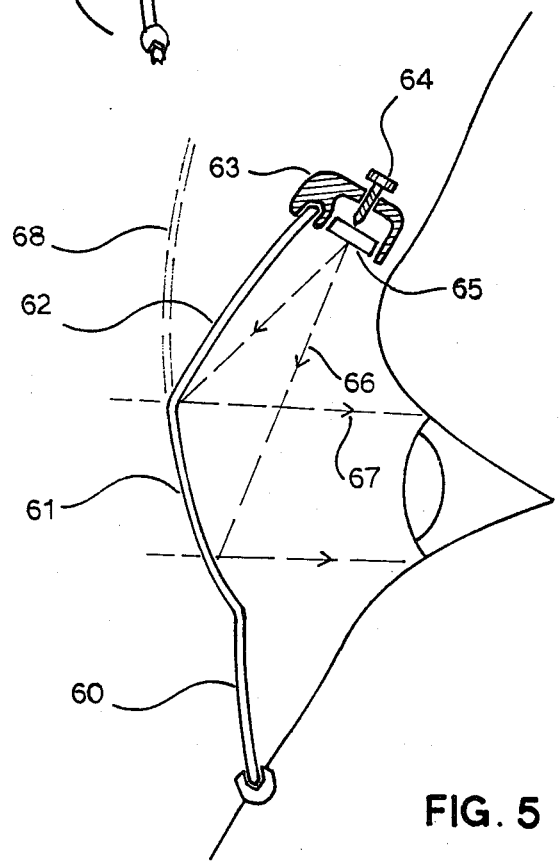
FIG. 5 shows a cross-sectional view of the display projection system. This embodiment is designed integral to a pair of special sunglasses.

Finally FIG. 5 shows a cross-sectional drawing of one side of a pair of sunglasses, specifically designed to combine the display projection system as an integral part. The sunglasses eye-pieces are shaped such that they become part of the novel projection window as well as the sunglasses eye-pieces. The eye-piece as shown is divided into three sections. The upper section 62, the middle section 61 and the lower section 60. The middle section 61 is shaped into a parabolic section, such that the focal point is approximately around the top part of the rim of the sunglasses. The upper and lower sections 62 and 60 are the non active parts of the projection system and is suitably shaped as part of the sunglasses eye-piece. For illustration purposes the active parabolic section 61 of the sunglasses eye-piece is shown continued by the dashed line labelled 68. This clearly shows the relative position of the focal point of the parabolic section 61, situated approximately at the display panel 65 position. The top part of the rim of the sunglasses 63 is shown with a built in compartment for housing the opto-electronic display panel 65 with the associated focussing screw 64, coupled to move the display panel relative to the projection window 61.

FIG. 5 illustrates the paths taken by light from the display surface, shown by the dashed lines 66, where it is partially reflected by the active section 61 shown by the dashed lines 67. Since the section 61 is part of a parabolic section with the focal point approximately at the display panel position 65, a virtual image of the display is seen projected along with the normal view seen by the sunglasses when the display is activated.

When designed for attachment to spectacles or sunglasses the mounting methods shown in FIG. 3 and 4 performes better than the mounting method shown in FIG. 1 and 2. This is because in the method shown in FIG. 1 and 2, the light projected by the projection window has to pass through the eye-piece of the spectacles or sunglasses where it is partially transmitted, therefore reduced in intensity. Furthermore the mounting method used in FIG. 3 and 4 substantially hides the projection system behind the spectacles or sunglasses, which is more appealing. Additionally tests have shown that there is sufficient room between the eye and the eye-piece of the spectacles or sunglasses to accommodate the projection window section without touching the eye or being uncomfortable to the wearer.

The opto-electronic display panel in the simplest form, may consist of only a seven segment numerical display, such as used in the electronic watch industry. It may be of the light emitting diode (LED) type or liquid crystal display (LCD) type, in which case an ordinary miniature filament type light source is needed to illuminate the LCD with back lighting. The above display being suitable for use as a self contained electronic timepiece application for the projection system. In a more advanced application of the projection system the LCD type may consist of an active matrix technology display as used in the pocket television industry. In which case a complete television reception unit may be carried externally and connected by wire to the LCD display panel for projection by the projection system.

I claim:

1. A display projection optical system attachment for spectacles or sunglasses comprising:
   (a), A miniature housing with a mounting and securing disposition means for attachment to a pair of spectacles or sunglasses frame such that the normal field of vision is not obstructed,
   (b), An opto-electronic display panel contained in said housing, means to electronically display bright luninous visual display images when electrically activated,
   (c), Micro electronic circuitary means to generate electronic functions, providing useful video display information to drive said opto-electronic display panel,
   (d), A projection window made of thin optically transparent material with an active projection area formed into an oblong concave section of a parabolic surface and the rest of the area continues to make a fixture to said miniature housing, means to collect and partially reflect the light from said display so as to project a well focussed virtual image in front of the eye to appear superimposed on the normal field of view of the spectacles or sunglasses wearer when said display is activated,
   (e), A convenient mechanical means to adjust and focus said display image,
   (f), Means for supplying electric power to said opto-electronic display panel and said micro electronic circuitary,
   (g), A readily accessible miniature press button micro switch means to activate said opto-electronic display when required,
   (h), Further micro switches electrically coupled to said micro electronic circuitary means to adjust or select display parameters and functions.

2. A display projection optical system attachment for spectacles or sunglasses as claimed in claim 1 wherein said projection window active parabolic concave section is chosen and oriented such that the focal point is approximately at said display panel position, furthermore when said miniature housing is mounted on to a spectacles or sunglasses frame it shall present said active concave section of said projection window in front of an eye of the spectacles or sunglasses wearer with no obstruction to the optical path between said display panel and said active concave projection section.

3. A display projection optical system attachment for spectacles or sunglasses as claimed in claim 1 wherein said opto-electronic display panel further comprises either light emitting diode display technology or liquid crystal display technology, capable of providing either simple alpha-numeric displays or video quality image displays.

4. A display projection optical system attachment for spectacles or sunglasses as claimed in claim 1 wherein said micro electronic circuitary further comprises either electronic time of day generating functions housed within said housing or complete television reception circuitary carried externally and electrically connected to said display panel.

5. A display projection optical system attachment for spectacles or sunglasses as claimed in claim 1 wherein said convenient focussing adjustment further comprises a miniature manual adjuster mechanically coupled to vary the position of said display panel relative to said projection window active concave section.

6. A combination sunglasses display projection system comprising:
   (a), A miniature opto-electronic display panel, means to electrically generate bright luminous visual display images,
   (b), Micro electronic circuitary, means to generate electronic functions, providing useful video display information to drive said opto-electronic display panel,
   (c), A conventional style sunglasses frame, with built in compartments, means to house said opto-electronic display panel and said micro electronic circuitary,
   (d), A pair of sunglasses eye-piece viewing surfaces, constructed and formed, such that part of the eye-piece surface is shaped into a parabolic active section, concaved towards the eye, means to partially reflect a focussed image of said display directly to the eye, so as to produce a virtual image of said display, to appear superimposed on the normal field of view of the sunglasses when said display is activated,
   (e), A convenient mechanical means to adjust and focus said display image,
   (f), Means to provide electric power to said opto-electronic display panel and said micro electronic circuitary,
   (g), A readily accessible miniature push button micro switch, means to activate said opto-electronic display when required,
   (h), Further micro switches, electrically coupled to said micro electronic circuitary, means to adjust or select display parameters and functions.

7. A combination sunglasses display projection system as claimed in claim 6, wherein said opto-electronic display panel, housed in said compartment of said sunglasses frame, is so disposed, to present the display surface, open and generally facing towards the inside surface of said active parabolic section of an eye-piece of said sunglasses, with no obstruction, additionally said display panel shall be disposed approximately at the focal point of said parabolic active section of said eye-piece.

8. A combination sunglasses display projection system as claim in claim 6, wherein said convenient focussing adjustment, further comprising a miniature manual adjuster, mechanically coupled, to vary the position of said display panel relative to said eye-piece parabolic active section.

9. A combination sunglasses display projection system as claimed in claim 6 wherein said opto-electronic display further comprises either light emitting diode display technology or liquid crystal display technology capable of providing either simple alpha-numeric displays or video quality image displays.

10. A combination sunglasses display projection system as claimed in claim 6 wherein said micro electronic circuitary further comprises either electronic time of day generating functions housed within said compartments of the sunglasses frame or complete television reception circuitary carried externally and electrically connected to said opto-electronic panel.

* * * * *